United States Patent
Skog et al.

(10) Patent No.: US 9,832,593 B2
(45) Date of Patent: Nov. 28, 2017

(54) ACCESSING DATA SERVICES WHILE ROAMING

(71) Applicant: TELEFONAKTIEBOLAGET LM ERICSSON (PUBL), Stockholm (SE)

(72) Inventors: Robert Skog, Hässelby (SE); Michael Huber, Täby (SE); Johan Kölhi, Vaxholm (SE); Andreas Ljunggren, Vällingby (SE); Bjorn Stromberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/127,842

(22) PCT Filed: Mar. 21, 2014

(86) PCT No.: PCT/EP2014/055709
§ 371 (c)(1),
(2) Date: Sep. 21, 2016

(87) PCT Pub. No.: WO2015/139770
PCT Pub. Date: Sep. 24, 2015

(65) Prior Publication Data
US 2017/0118577 A1    Apr. 27, 2017

(51) Int. Cl.
*H04W 4/00*     (2009.01)
*H04W 8/02*     (2009.01)
(Continued)

(52) U.S. Cl.
CPC .............. *H04W 4/003* (2013.01); *H04W 8/02* (2013.01); *H04W 8/18* (2013.01); *H04W 48/04* (2013.01)

(58) Field of Classification Search
CPC .... G06F 9/445; G06F 9/44505; G06F 9/4451; G06F 3/0637; G06F 15/0241;
(Continued)

(56) References Cited

U.S. PATENT DOCUMENTS 8,516,476 B2 *  8/2013  Chen ................... G06F 21/6218
                                                      717/176
8,554,179 B2 * 10/2013  Pecen .................. H04L 63/101
                                                      455/411
(Continued)

OTHER PUBLICATIONS

International Search Report and Written Opinion dated Nov. 20, 2014, in International Application No. PCT/EP2014/055709, 8 pages.

*Primary Examiner* — Meless Zewdu
(74) *Attorney, Agent, or Firm* — Rothwell, Figg, Ernst & Manbeck, P.C.

(57) ABSTRACT

A method, in a user equipment device, for managing use of applications installed on the user equipment device is disclosed. The method comprises receiving a request from a user to launch an application, checking whether the user equipment device is roaming, and, if the user equipment device is roaming, consulting a user roaming profile and preventing launch of the application if the user roaming profile indicates that launch of the application is not permitted while roaming. Also disclosed are a computer program product for carrying out the above method and a user equipment device configured to carry out the above method.

14 Claims, 5 Drawing Sheets

(51) Int. Cl.
*H04W 8/18* (2009.01)
*H04W 48/04* (2009.01)

(58) Field of Classification Search
CPC .......... G06F 21/50; G06F 21/51; G06F 21/62; G06F 21/629; H04W 4/02; H04W 4/003; H04W 8/18; H04W 12/00; H04W 12/08; H04W 12/10; H04W 36/00; H04W 48/04; H04W 8/02; H04W 4/00; H04L 29/08657; H04L 67/34; H04L 29/08711
See application file for complete search history.

(56) References Cited

U.S. PATENT DOCUMENTS

| | | | |
|---|---|---|---|
| 8,955,050 B1* | 2/2015 | Shigapov | H04L 63/08 726/3 |
| 2006/0258287 A1* | 11/2006 | Bidet | H04L 12/5855 455/41.2 |
| 2008/0084799 A1* | 4/2008 | Repasi | G06F 11/1446 369/47.12 |
| 2009/0049526 A1* | 2/2009 | Zhang | H04L 63/101 726/4 |
| 2009/0181651 A1* | 7/2009 | Klassen | H04M 1/72547 455/414.1 |
| 2011/0189991 A1* | 8/2011 | Krause | H04W 4/00 455/432.1 |
| 2012/0129503 A1* | 5/2012 | Lindeman | H04W 4/001 455/414.1 |
| 2013/0205366 A1* | 8/2013 | Luna | H04L 63/101 726/1 |
| 2013/0316703 A1 | 11/2013 | Girard et al. | |
| 2014/0006347 A1* | 1/2014 | Qureshi | G06F 21/10 707/621 |
| 2014/0237351 A1* | 8/2014 | Seidl | G06F 17/30905 715/234 |

* cited by examiner

ACCESSING DATA SERVICES WHILE ROAMING

CROSS REFERENCE TO RELATED APPLICATION(S)

This application is a 35 U.S.C. §371 National Phase Entry Application from PCT/EP2014/055709, filed Mar. 21, 2014, designating the United States, the disclosure of which is incorporated herein in its entirety by reference.

TECHNICAL FIELD

The present invention relates to a method, and a user equipment device, for managing use of applications installed on the user equipment device. The invention also relates to a computer program product configured, when run on a computer, to carry out a method for managing use of applications installed on a user equipment device.

BACKGROUND

Telecommunications networks are increasingly used to deliver data services to network users. These services may be offered by an operator of the network or may be offered, via the network, by independent service providers. When a user is within the geographic coverage area of their home network, that is the network to which they subscribe, data services are requested and delivered via a gateway support node within the home network, through which data traffic may be exchanged with an external network such as the internet. The majority of network operators offer varying levels of data access for users within their different subscription offerings.

When a network user is outside the geographic coverage area of their home network, they may still access voice and data services by connecting to their home network via a visited network with which their home network has a roaming agreement. When roaming, data traffic from the user is routed through the visited network to the home network, and incoming data traffic is routed via the home network to the visited network before reaching the user. While this arrangement offers the advantage of maintaining access to data services for a roaming user, roaming data access typically results in high charges for roaming data services, as the cost of data traffic through both the home and visited networks is covered by the user. Consequently, many users disable the data service capability within their wireless device in order to avoid these high charges.

The practice of disabling mobile data when roaming is disadvantageous both for the user and for network operators. Home and visited networks are deprived of revenue generating data traffic, and the user is obliged to go without data services which they are accustomed to accessing. Some data services may be of even greater practical value to a user when travelling outside their home network coverage area, for example when travelling internationally, and it is thus a significant disadvantage for users to be constrained to go without these services when roaming.

Additionally, the step of disabling data service capability on a wireless device may not in fact stop all data traffic from leaving the device. In the majority of cases, disabling data on a wireless device means that data traffic is stopped in a firewall or proxy within the device. However, a firewall or proxy may not stop all types of data traffic from being delivered from the device. For example, Domain Name Server (DNS) lookup and/or certificate validation may not be stopped by a device firewall or proxy and a Packet Data Protocol (PDP) context may still be set up when an application is launched, even if data traffic is being stopped by a device firewall or proxy. This breakthrough traffic may incur data charges for the user even though the user is not profiting from the data service.

SUMMARY

It is an aim of the present invention to provide a method and apparatus which obviate or reduce at least one or more of the disadvantages mentioned above.

According to a first aspect of the present invention, there is provided a method, in a user equipment device, for managing use of applications installed on the user equipment device. The method comprises receiving a request from a user to launch an application, checking whether the user equipment device is roaming and, if the user equipment device is roaming, consulting a user roaming profile and preventing launch of the application if the user roaming profile indicates that launch of the application is not permitted while roaming.

Aspects of the present invention thus introduce a degree of selectivity in the use of applications when roaming, preventing applications from launching when roaming according to a user roaming profile. By preventing the applications from launching, it may be ensured that no breakthrough traffic associated with the applications is permitted to leave the user equipment device.

In some examples, the method may further comprise launching the application if the user roaming profile indicates that launch of the application is permitted while roaming.

In some examples, preventing launch of the application may comprise preventing any traffic relating to the application from leaving the user equipment device.

In some examples, preventing launch of the application may comprise preventing the establishing of a Packet Data Protocol context for the application.

In some examples, the method may further comprise informing the user that the requested application is not permitted to start if the user roaming profile indicates that launch of the application is not permitted while roaming.

In some examples, the method may further comprise, if the user equipment device is not roaming, launching the application without consulting the user roaming profile.

In some examples, the user roaming profile may comprise a list of at least one application and an associated indication of whether or not launch of the application is permitted while roaming. In some examples, the list may contain all applications permitted to launch while roaming, or a list of all applications not permitted to launch while roaming. In such examples, the indication as to permission to launch when roaming may be the presence or absence of the application in the list. Consulting the user roaming profile may in such examples comprise checking whether or not the requested application appears on the list. In other examples, the list may include all applications installed on the user equipment device, and each list entry may have a corresponding indication as to whether the application of that entry is permitted or not permitted to launch when roaming. Consulting the user roaming profile may in such examples comprise locating the requested application in the list and checking for the associated indication of permission for that application.

In some examples, the user roaming profile may be stored in a memory of the user equipment device.

In some examples, the user roaming profile may be configurable by the user of the user equipment device.

In some examples, the method may be configured to run within an operating system of the user equipment device.

According to another aspect of the present invention, there is provided a computer program product configured, when run on a computer, to carry out a method according to a first aspect of the present invention.

According to another aspect of the present invention, there is provided a user equipment device configured for managing use of applications installed on the user equipment device. The user equipment device comprises a receiving unit configured to receive a request from a user to launch an application, a roaming unit configured to check whether the user equipment device is roaming, and an application management unit configured, if the user equipment device is roaming, to consult a user roaming profile and to prevent launch of the application if the user roaming profile indicates that launch of the application is not permitted while roaming.

In some examples, the user equipment device may further comprise a memory configured to store a user roaming profile.

In some examples, the user equipment device may further comprise a display unit configured to inform the user that the requested application is not permitted to start if the user roaming profile indicates that launch of the application is not permitted while roaming.

According to another aspect of the present invention, there is provided a user equipment device configured for managing use of applications installed on the user equipment device, the user equipment device comprising a processor and a memory, the memory containing instructions executable by the processor whereby the network element is operative to receive a request from a user to launch an application, check whether the user equipment device is roaming, and if the user equipment device is roaming, consult a user roaming profile and prevent launch of the application if the user roaming profile indicates that launch of the application is not permitted while roaming.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide a method for managing use of applications installed on a user equipment device. On receiving a request from a user to launch an application, the method involves checking whether the user equipment device is roaming and, if the user equipment device is roaming, consulting a user roaming profile and preventing launch of the application if the user roaming profile indicates that launch of the application is not permitted while roaming. The method thus permits the selective prevention of launch of an application when roaming according to a user roaming profile.

Figure 1:
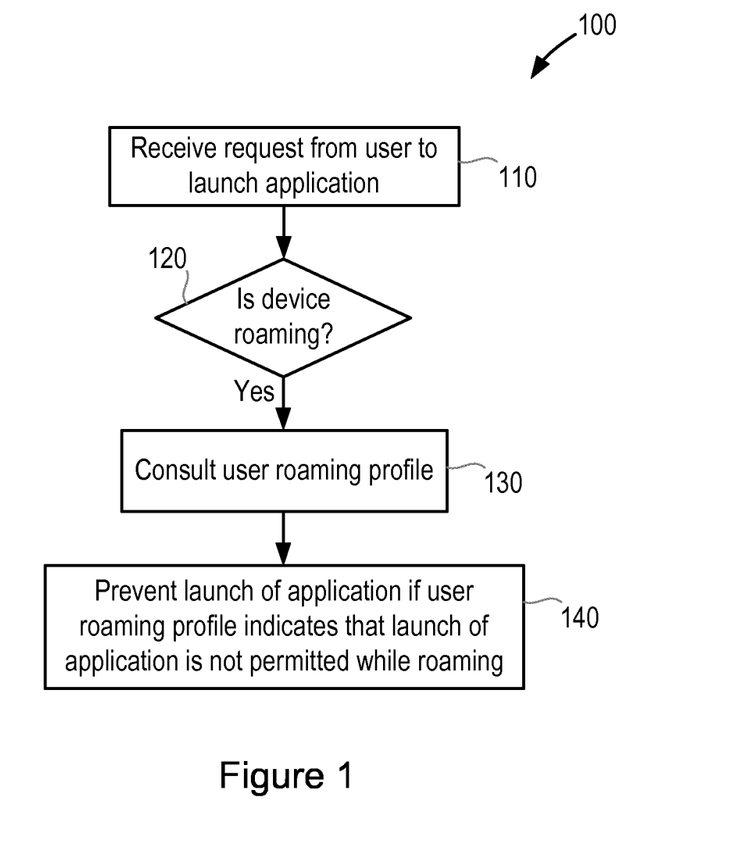
FIG. 1 is a flow chart illustrating process steps in a method for managing use of applications installed on a user equipment device.

FIG. 1 illustrates process steps in a method 100 for managing use of applications installed on a user equipment device. The method runs within a user equipment device, which may for example be a mobile phone, tablet computer or other wireless device. In one example, the method may run within the operating system (OS) of a user equipment device. For the purposes of illustration, the method is described below as running on a notional user equipment device (UE). Referring to FIG. 1, in a first step 110, the UE receives a request from a user to launch an application. The request may for example be received via an input screen or menu arrangement according to the OS running on the UE. Typical examples of requests for launching an application may include a user tapping a touch screen over an icon of the application or selecting an application icon using any other input interface provided on the UE. Launch of an application may also be requested indirectly through a user following a link or requesting information which may be provided via the application.

On receiving the request from a user to launch an application, the UE then checks, at step 120 whether or not the UE is roaming. As discussed above, roaming refers to a situation in which the UE is outside the geographic coverage area of its home network. A UE may thus check whether or not it is roaming by checking whether it is connected to a network node of its home network or to a network node of a different visited network, via which it is connected to its home network. The network node to which the UE is connected may for example be a radio access node such as a basestation, NodeB, eNodeB etc.

If the UE discovers at step 120 that it is roaming, it then proceeds to consult a user roaming profile at step 130. The user roaming profile may be stored on the UE and may indicate those applications installed on the UE which are permitted to start when the UE is roaming. The user roaming profile may identify each application by a name or other suitable application identifier. In one example, the user roaming profile may comprise a list of all applications installed on the UE which are permitted to start when roaming. In another example, the user roaming profile may comprise a list of all applications which are not permitted to start when roaming. In such examples, consulting the user roaming profile may comprise checking to see whether the requested application is included within the list of the user roaming profile. In other examples, the user roaming profile may comprise a list of all applications installed on the UE. Each list entry may be accompanied by an indication of whether or not that application is permitted to start when roaming. The list and indications may for example be presented as a table. In such examples, consulting the user roaming profile may comprise locating the requested application in the list and checking the corresponding permission indication.

After consulting the user roaming profile, the UE then proceeds, at step 140, to prevent launch of the requested application if the user roaming profile indicates that launch of the application is not permitted when roaming.

Figure 2:
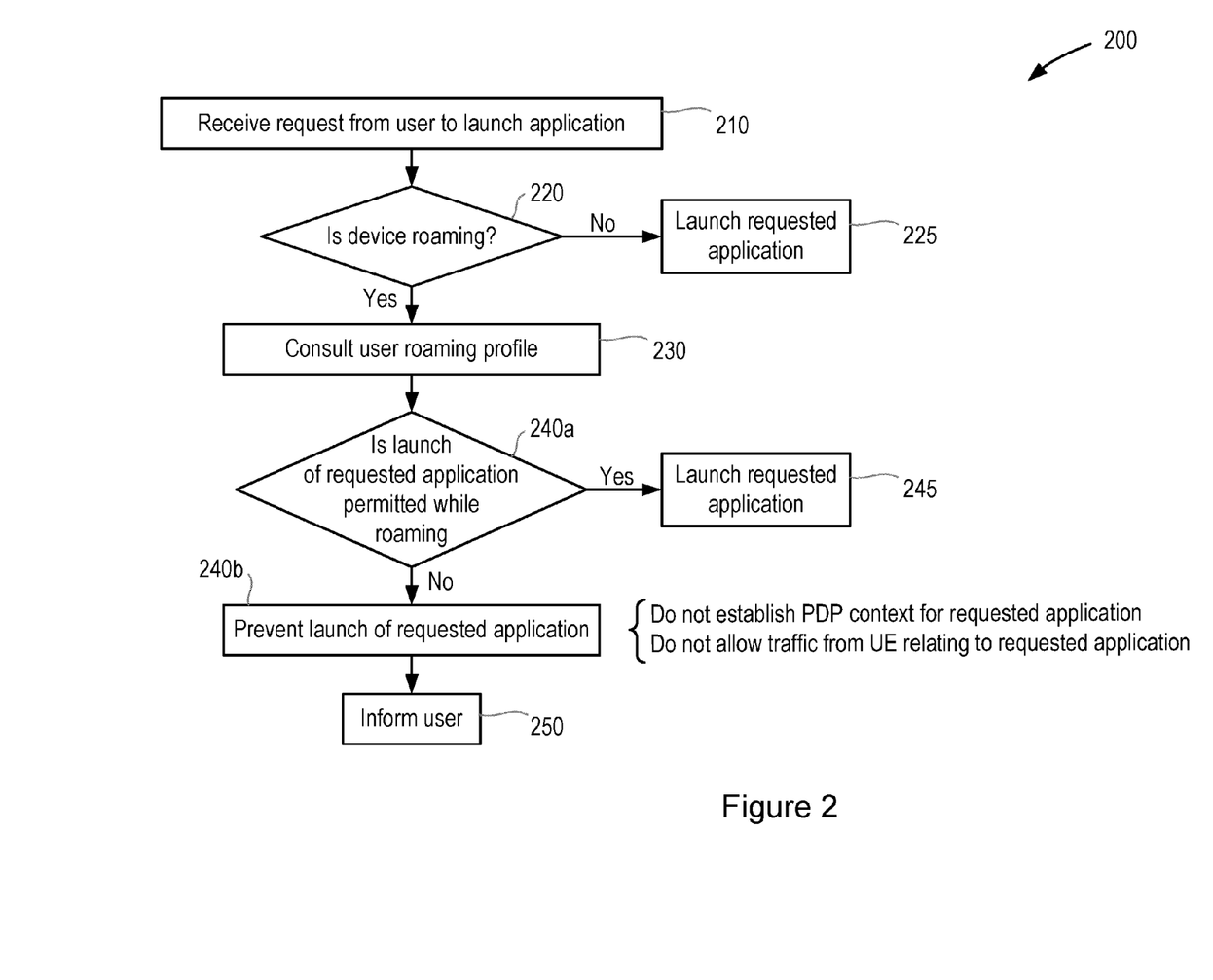
FIG. 2 is a flow chart illustrating process steps in another example of a method for managing use of applications installed on a user equipment device.

FIG. 2 illustrates another example of a method 200 for managing use of applications installed on a UE. The method of FIG. 2 illustrates how some of the steps of the method 100 of FIG. 1 may be further subdivided in order to achieve the above described functionality. FIG. 2 also illustrates some additional steps which may be conducted in conjunction with the steps 110 to 140 of FIG. 1. As above, and for the purposes of illustration, the method 200 is described as being conducted in a notional UE which may be representative of any user equipment device on which applications may be installed and which is capable of roaming operation.

Referring to FIG. 2, in a first step 210, the UE receives a request from a user to launch an application. As discussed above, the request may be received in various different ways depending upon the nature of the UE and its Operating System. On receipt of the request, the UE then checks, at step 220, whether or not the UE is roaming. This may for example comprise checking an identity of a radio access node to which the UE is connected. If the UE discovers that it is not roaming (No at step 220), for example by identifying its serving radio access node as belonging to its home network, then the UE proceeds to launch the requested application at step 225.

If the UE discovers that it is roaming (Yes at step 220), then it proceeds to consult a user roaming profile at step 230. As discussed above, this may comprise consulting a list of applications installed on the UE, and may also comprise checking a corresponding permission indication, depending upon the nature of the list. On consulting the user roaming profile, the UE then checks, at step 240a, whether or not launch of the requested application is permitted while roaming. If launch of the requested application is permitted while roaming (Yes at step 240a), then the UE proceeds to launch the requested application at step 245. If launch of the application is not permitted while roaming, (No at step 240a), the UE proceeds at step 240b, to prevent launch of the requested application. By preventing the application from launching within the UE, it may be assured that no PDP context is established for the application, and that no traffic relating to the application is permitted to leave the UE. Finally, at step 250, the UE proceeds to inform the user that they are currently roaming and that the requested application will not be launched as use of the application is not permitted while roaming. This information may be conveyed for example via an information message displayed on a screen of the UE. The information message may in some examples prompt the user to review their user roaming profile and update the profile if they wish to permit use of the requested application while roaming.

Figure 3:
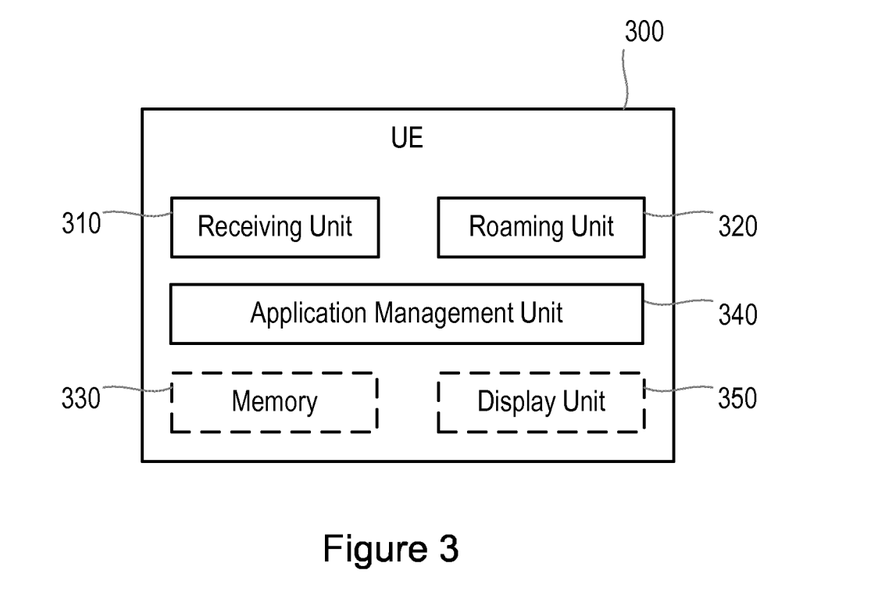
FIG. 3 is a block diagram illustrating functional units in a user equipment device.

FIG. 3 illustrates functional units in a user equipment device (UE) 300 which may execute the steps of the methods 100, 200 of FIGS. 1 and 2, for example according to computer readable instructions received from a computer program. The functional units of FIG. 3 may be incorporated into any UE, including for example a mobile phone, tablet computer or other wireless device. It will be understood that the units illustrated in FIG. 3 are functional units, and may be realised in any appropriate combination of hardware and/or software.

With reference to FIG. 3, the user equipment device 300 comprises a receiving unit 310, a roaming unit 320 and an application management unit 340. The UE may also comprise a memory 330 and a display unit 350. The receiving unit 310 is configured to receive a request from a user to launch an application. The roaming unit 320 is configured to check whether the UE is roaming. The application management unit 340 is configured, if the user equipment device is roaming, to consult a user roaming profile and to prevent launch of the application if the user roaming profile indicates that launch of the application is not permitted while roaming. If present in the UE 300, the memory 330 is configured to store a user roaming profile, and the display unit 350 is configured to inform the user that the requested application is not permitted to start if the user roaming profile indicates that launch of the application is not permitted while roaming.

Figure 4:
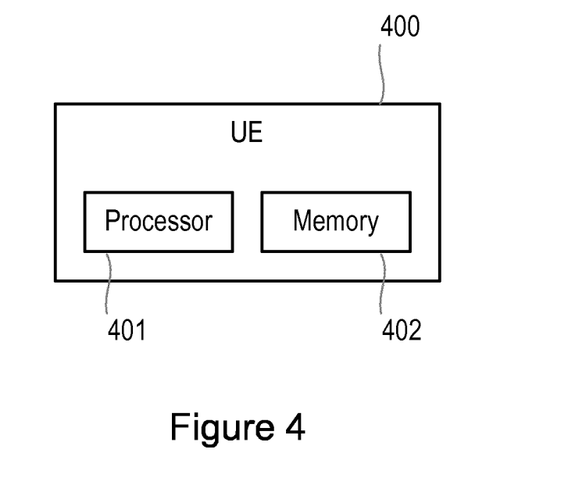
FIG. 4 is a block diagram illustrating functional units in another example of a user equipment device.

FIG. 4 illustrates another example of UE 400 which may be configured to conduct the methods 100, 200 of FIGS. 1 and 2. The UE 400 comprises a processor 401 and a memory 402. The memory 402 contains instructions executable by the processor 401 such that the UE 400 is operative to conduct the steps of any of the method 100 of FIG. 1 and/or the method 200 of FIG. 2.

Figure 5:
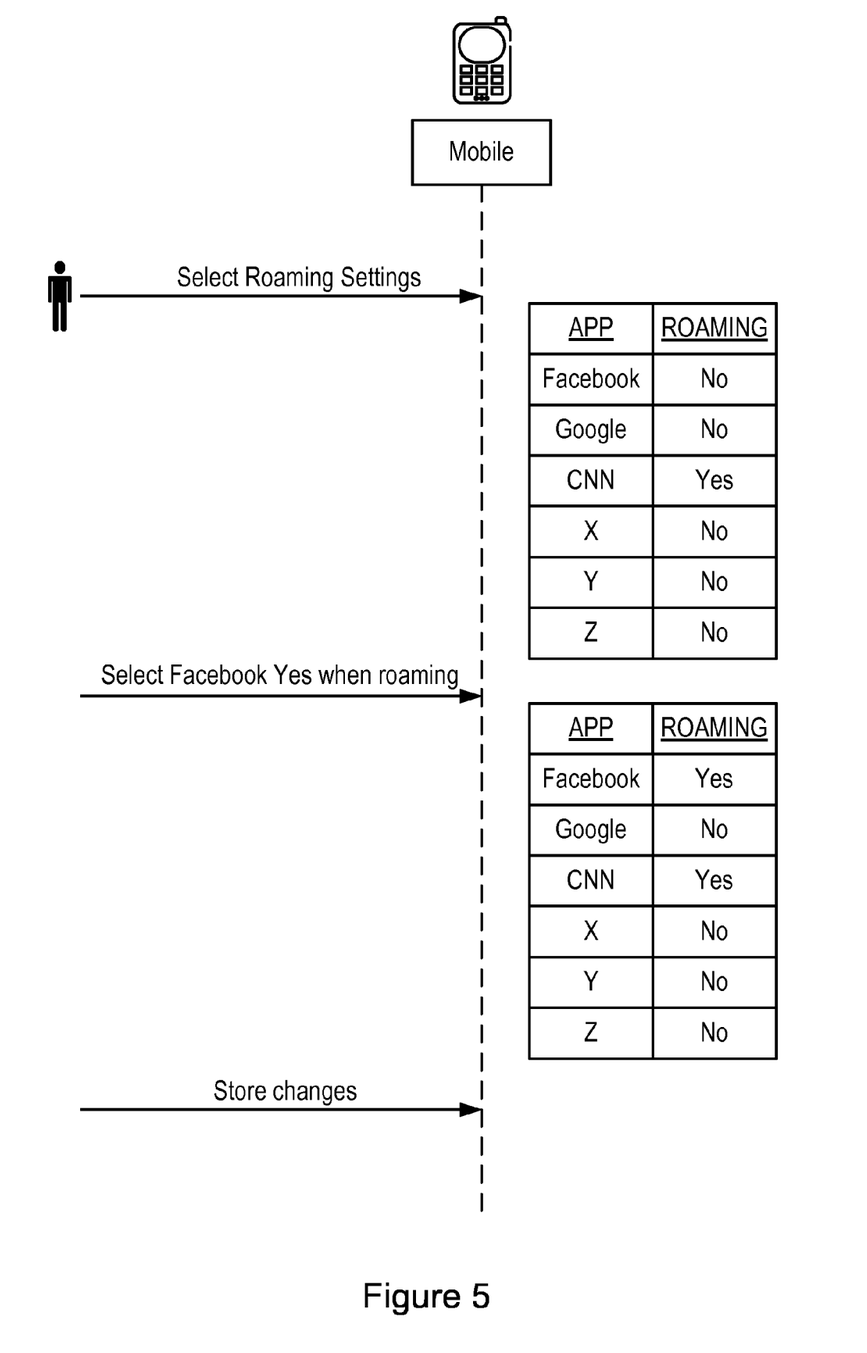
FIG. 5 is a schematic illustration of configuring of a user roaming profile.

As discussed above, the user roaming profile may take various different forms and may be configurable by the user. FIG. 5 is a schematic illustration representing the process of configuring a user roaming profile. In the illustration of FIG. 5, an example user roaming profile is illustrated in the form of a table comprising a list of all applications installed on the UE, with each list entry being accompanied by an indication as to whether or not that application is permitted to launch when roaming. Referring to FIG. 5, in a first step, the user selects the roaming settings within their UE, opening the user roaming profile for viewing. The user roaming profile is represented in the Figure with the application list and corresponding roaming permissions. Example applications corresponding to Facebook®, Google® and CNN® are shown for illustrative purposes, but it will be appreciated that these are for example only.

If the user wishes to update their user roaming profile, they may select an application and change the permission for that application. In the illustrated example, the user selects the Facebook® application and selects "Yes" to indicate that the application should be permitted to start when the UE is roaming. Finally the user saves the changes to the user roaming profile, completing the updating process. On first use of the UE, the user may create the user roaming profile by setting permissions for each application installed on the UE. On subsequent download of new applications, the user may be prompted to update the user roaming profile with a roaming permission for the newly downloaded application. Security settings may be imposed such that only the registered owner or administrator of the UE may update the user roaming profile.

Figure 6:
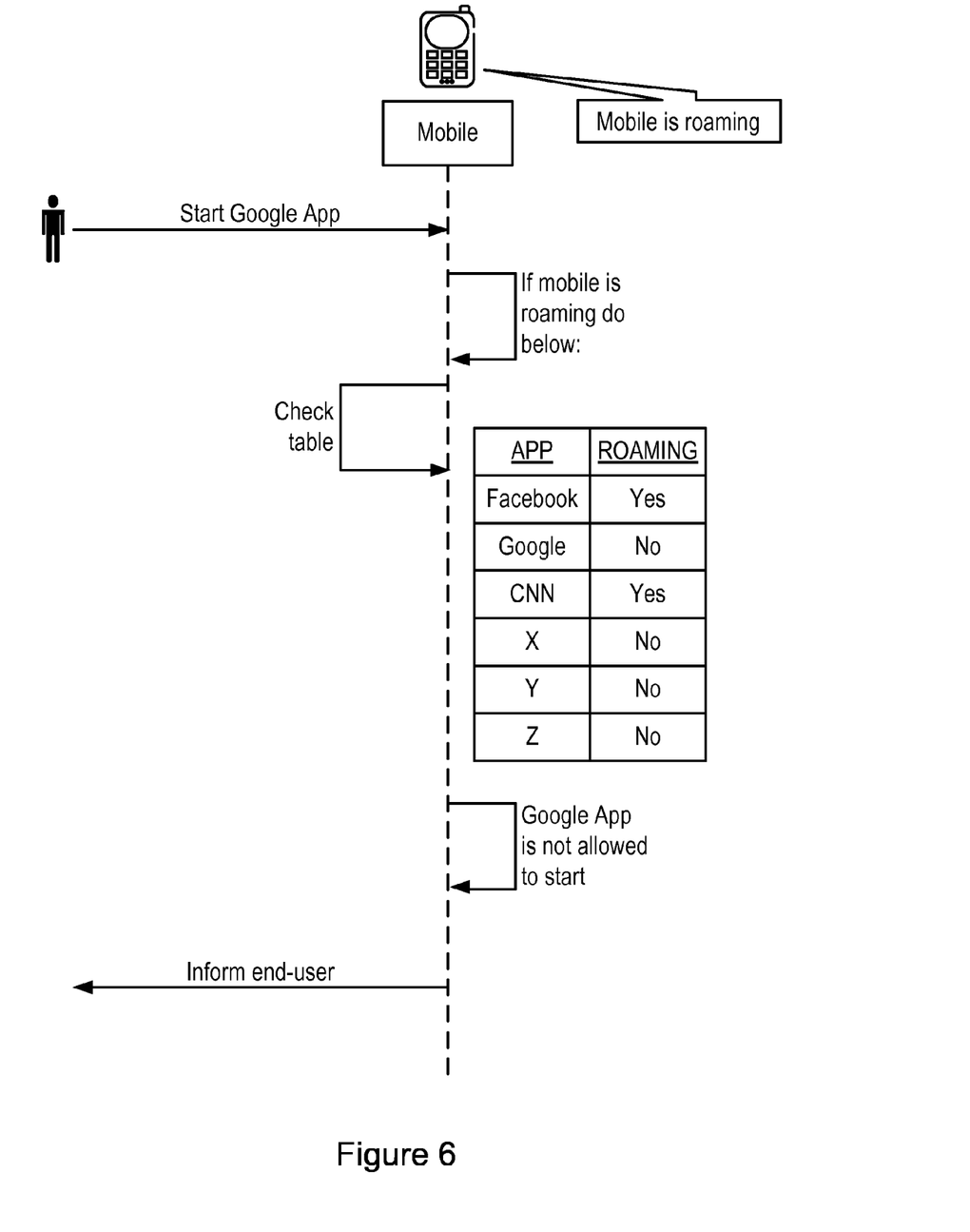
FIG. 6 is a schematic illustration of operation of the methods of FIGS. 1 and 2.

Continuing the example of FIG. 5, FIG. 6 is a schematic representation of operation of the methods of FIGS. 1 and 2, illustrating how the methods may be implemented with the example user and user roaming profile of FIG. 5. Referring to FIG. 6, in a first step, the user attempts to start an application, in the illustrated example the requested application is a Google® application. The UE then checks whether or not it is roaming. If the UE is not roaming, it proceeds to launch the requested application as normal. If the UE is roaming, then it continues to follow the steps of the methods 100 200, checking the user roaming profile. The user roaming profile shows that the Google® application does not have permission to start when roaming, and this information is extracted from the profile and prompts the UE to prevent starting of the Google® application. The user is informed that the application will not be started as it is not permitted to start when roaming.

Preventing an application from launching if it does not have permission to start when roaming has a different effect to that of a firewall or proxy located in a UE and stopping data traffic. As discussed in the background section, a firewall or proxy in the UE only intervenes when data traffic is sent in connection with an application which has been started. While a proxy or firewall may stop the majority of data traffic, some breakthrough packets such as certificate authentication or DNS lookup may be allowed through. In addition, a PDP context for the application may be established. In contrast, by preventing the application from starting at all, aspects of the present invention prevent any traffic connected with the application from being generated or sent. No PDP context is established as the application is not even started up. Aspects of the invention thus operate at the level of the operating system, preventing the application from launching as opposed to allowing the application to launch and then blocking its data traffic, as in known firewall/proxy solutions. Aspects of the invention thus prevent any breakthrough traffic in non permitted applications.

In addition, aspects of the present invention enable a degree of selectivity in data roaming, offering an alternative to the standard "on"/"off" choice. Instead of simply turning data roaming off to avoid high data charges when roaming, a user may configure their user roaming profile such that only those applications that the user wishes to be able to access when roaming are permitted to start when the user is roaming. The user thus ensures that not even small amounts of breakthrough data traffic will be permitted for those applications not authorised to start. In contrast, those applications which the user chooses to authorise for roaming use will start as normal when roaming. In this manner, the user may elect to pay for roaming use only for those applications which are sufficiently important to the user when roaming to warrant payment of the higher data charges associated with roaming. The user is thus offered greater flexibility and may ensure that they pay only for the services they wish to use. This selective authorising of applications when roaming is also likely to lead to increased data traffic from roaming users, as those who would usually switch data roaming off completely elect to allow data roaming for only a small number of important applications. The selective authorising of data roaming thus also offers advantages to network operators.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, in a user equipment device, for managing use of applications installed on the user equipment device, the method comprising:
   receiving a request from a user to launch an application;
   determining whether the user equipment device is roaming; and
   based on the determination that the user equipment device is roaming, consulting a user roaming profile to determine whether the launch of the application is permitted while roaming, wherein the user roaming profile comprises a list including: (i) the applications installed on the user equipment device and (ii) associated indication of roaming permission for each of the applications;
   determining whether the user roaming profile indicates that the launch of the application is not permitted while roaming; and
   based on the determination that the user roaming profile indicates that the launch of the application is not permitted while roaming, preventing the launch of the application.

2. The method as claimed in claim 1, further comprising based on the determination that the user roaming profile indicates that the launch of the application is permitted while roaming, launching the application.

3. The method as claimed in claim 1, wherein preventing the launch of the application comprises preventing any traffic relating to the application from leaving the user equipment device.

4. The method as claimed in claim 1, wherein preventing the launch of the application comprises preventing the establishing of a Packet Data Protocol context for the application.

5. The method as claimed in claim 1, further comprising:
   based on the determination that the user profile indicates that the launch of the application is not permitted while roaming, informing the user that the requested application is not permitted to start.

6. The method as claimed in claim 1, further comprising:
   based on the determination that the user equipment device is not roaming, launching the application without consulting the user roaming profile.

7. The method as claimed in claim 1, wherein the user roaming profile is stored in a memory of the user equipment device.

8. The method as claimed in claim 1, wherein the user roaming profile is configurable by the user of the user equipment device.

9. The method as claimed in claim 1, wherein the method is configured to run within an operating system of the user equipment device.

10. A program comprising computer executable instructions stored on a non-transitory computer readable medium, which when executed by a computer, causes the computer to perform the method as claimed in claim 1.

11. A user equipment device configured for managing use of applications installed on the user equipment device, the user equipment device comprising:
   a receiving unit configured to receive a request from a user to launch an application;
   a roaming unit configured to determine whether the user equipment device is roaming; and
   an application management unit configured to:
   based on a determination that the user equipment device is roaming, consult a user roaming profile to determine whether the launch of the application is permitted while roaming, wherein the user roaming profile comprises a list including: (i) the applications installed on the user equipment and ii) associated indication of a roaming indication of a roaming permission for each of the applications;
   determine whether the user roaming profile indicates that the launch of the application is not permitted while roaming; and based on the determination that the user roaming profile indicates that the launch of the application is not permitted while roaming, prevent the launch of the application.

12. The user equipment device as claimed in claim 11, further comprising a memory configured to store the user roaming profile.

13. The user equipment device as claimed in claim 11, further comprising a display unit configured to:

based on the determination that the user roaming profile indicates that the launch of the application is not permitted while roaming, inform the user that the requested application is not permitted to start.

14. A user equipment device configured for managing use of applications installed on the user equipment device, the user equipment device comprising a processor and a memory, the memory containing instructions executable by the processor whereby the processor is operative to:

receive a request from a user to launch an application;
determine whether the user equipment device is roaming;
based on the determination that the user equipment device is roaming, consult a user roaming profile to determine whether the launch of the application is permitted while roaming, wherein the user roaming profile comprises a list including: (i) the applications installed on the user equipment, and (ii) associated indication of roaming permission for each of the applications;
determine whether the user roaming profile indicates that the launch of the application is not permitted while roaming; and
based on the determination that the user roaming profile indicates that the launch of the application is not permitted while roaming, prevent the launch of the application.

* * * * *

UNITED STATES PATENT AND TRADEMARK OFFICE
CERTIFICATE OF CORRECTION

PATENT NO. : 9,832,593 B2
APPLICATION NO. : 15/127842
DATED : November 28, 2017
INVENTOR(S) : Skog et al.

Page 1 of 1

It is certified that error appears in the above-identified patent and that said Letters Patent is hereby corrected as shown below:

In the Specification

In Column 6, Line 56, delete "methods 100 200," and insert -- methods 100, 200, --, therefor.

In the Claims

In Column 8, Line 62, in Claim 11, delete "and ii)" and insert -- and (ii) --, therefor.

In Column 8, Lines 62-63, in Claim 11, delete "indication of a roaming indication of a roaming permission" and insert -- indication of a roaming permission --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*